US008249545B2

(12) United States Patent
Dolezal et al.

(10) Patent No.: US 8,249,545 B2
(45) Date of Patent: *Aug. 21, 2012

(54) EMERGENCY BROADCAST MESSAGE RECEIVER

(75) Inventors: Anthony J. Dolezal, Barrington, IL (US); Gerald J. Gutowski, Glenview, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1728 days.

This patent is subject to a terminal disclaimer.

(21) Appl. No.: 10/938,235

(22) Filed: Sep. 10, 2004

(65) Prior Publication Data

US 2006/0058004 A1 Mar. 16, 2006

(51) Int. Cl.
*H04M 11/01* (2006.01)

(52) U.S. Cl. .............. 455/404.1; 455/404.2; 455/414.2; 455/521; 455/456.1; 455/456.3; 455/456.4; 455/456.5; 455/456.6

(58) Field of Classification Search .............. 455/404.2, 455/414.2, 503, 404.1, 521, 456.1–456.6
See application file for complete search history.

(56) References Cited

U.S. PATENT DOCUMENTS

| 6,112,075 | A | 8/2000 | Weiser |
| 6,370,391 | B1 * | 4/2002 | Lietsalmi et al. ............. 455/466 |
| 6,430,603 | B2 | 8/2002 | Hunter |
| 6,522,877 | B1 | 2/2003 | Lietsalmi et al. |
| 6,571,092 | B2 * | 5/2003 | Faccin et al. ............... 455/404.1 |
| 6,591,112 | B1 * | 7/2003 | Siccardo et al. ............. 455/521 |
| 6,745,021 | B1 | 6/2004 | Stevens |
| 6,847,892 | B2 * | 1/2005 | Zhou et al. .................... 701/213 |
| 7,065,364 | B1 * | 6/2006 | Todd .............................. 455/445 |
| 2002/0012323 | A1 * | 1/2002 | Petite et al. .................... 370/252 |
| 2003/0121036 | A1 * | 6/2003 | Lock et al. ....................... 725/33 |
| 2003/0216133 | A1 | 11/2003 | Poltorak |
| 2004/0142656 | A1 * | 7/2004 | Bensimon et al. ........... 455/3.06 |
| 2004/0203562 | A1 * | 10/2004 | Kolsrud ..................... 455/404.1 |
| 2005/0085254 | A1 * | 4/2005 | Chuah et al. .................. 455/522 |
| 2005/0104745 | A1 * | 5/2005 | Bachelder et al. ............ 340/906 |
| 2005/0239436 | A1 * | 10/2005 | Bell et al. ................... 455/404.2 |
| 2006/0105793 | A1 * | 5/2006 | Gutowski et al. ............. 455/518 |

(Continued)

FOREIGN PATENT DOCUMENTS

KR          2002021586     *   3/2002

OTHER PUBLICATIONS

"3rd Generation Partnership Project; Technical Specification Group Services and System Aspects; Multimedia Broadcast/Multicast Service (MBMS) user services; Stage 1 (Release 6)", 3GPP TS 22.246 V6.1.0 (Mar. 2004) Technical Specification, 16 pages.

(Continued)

*Primary Examiner* — Kamran Afshar
*Assistant Examiner* — Edward Zhang

(57) ABSTRACT

A method (200) and an apparatus (106) for a communication device for conveying information contained in an emergency broadcast message to an external device (110) are provided. The communication device (106) monitors (204) incoming broadcast messages in at least one of a broadcast mode and a multicast mode of a Multimedia Broadcast and Multimedia Service, and determines (206) whether the incoming broadcast messages include the emergency broadcast message. If the emergency broadcast message is included, then the communication device (106) receives (208) the emergency broadcast message, transmits (210) an acknowledgment of receiving the emergency broadcast message, and transmits (212) the information (108) contained in the emergency broadcast message to the external device (110).

19 Claims, 4 Drawing Sheets

U.S. PATENT DOCUMENTS

2007/0136132 A1* 6/2007 Weiser et al. .................. 705/14

OTHER PUBLICATIONS

D.D. 'Bud' Weiser, Applications for the Transfer of Control of Licenses and Authorizations from AT&T Wireless Services, Inc. and its Subsidiaries to Cingular Wireless Corp., Before the Federal Communications Commission, Washington, D.C. 20554, WT Docket No. 04-70, 2 pages.

Scala—Case Studies, "Scala Software Provides Critical Information for Miami-Dade's Emergency Services", http://www.scala.com/studies/emergency.html, 2 pages.

Scala Solutions, "Inform the community in minutes, coordinate emergency management, rally morale with better feedback", www.scala.com. 2 pages.

"Technology Amber alerts to extend to e-mail, cell phones", Tuesday, Jul. 20, 2004 Posted: 3:21 PM EDT (1921 GMT), http://www.cnn.com/2004/TECH/ptech/07/20/mobile.alerts.ap/index.html, 3 pages.

"Solutions: Electronic Billboards & Electronic Signs", http://www.wirespring.com/Solutions/electronic_billboards_electronic_signs.html, 1 page.

Daktronics, http://www.daktronics.com/, 1 page.

"3$^{rd}$ Generation Partnership Project; Technical Specification Group Services and System Aspects; Multimedia Broadcast/Multicast Service (MBMS); Architecture and functional description (Release 6)", 3GPP TR 23.846 6.1.0 (Dec. 2002) Technical Report, 114 pages.

* cited by examiner

EMERGENCY BROADCAST MESSAGE RECEIVER

FIELD OF THE INVENTION

The present invention generally relates to broadcasting messages, and more specifically, to receiving an emergency broadcast message.

BACKGROUND OF THE INVENTION

In a wireless communication system, such as a cellular telephone system, a broadcast message, such as a short message service ("SMS") message, a cell broadcast service ("CBS") message, and a Multimedia Broadcast and Multimedia Service ("MBMS") message, can be transmitted from a base station to wireless portable communication devices that are registered to the base station. Generally, a user subscribes to a service provider for messages that provide information of his choice, such as news, sports, stock quotes, and others alike, and receives messages containing information of his choice from the service provider. However, there is no requirement to subscribe to any broadcast message service, and those wireless portable communication devices without subscription may ignore all broadcast messages. When the wireless portable communication device receives the broadcast message, the user may choose to view and/or listen to the received broadcast message now or later. However, this capability of allowing the user to delay accessing the received broadcast message can be detrimental to the user's interest in some circumstances. Further, those users without any message subscription are not even aware of the broadcast message, which may be of great interest. In emergency or time critical situations, such as a terrorist attack, abduction, bomb threat, traffic accident, traffic jam, severe weather, fire, crime, or other situations alike, it would be in the user's and the public's best interest to receive and access a message regarding the emergency as soon as the message is received. For example, if a severe weather condition, such as a tornado, has just developed in the area where the user is located and a local base station transmits an emergency broadcast message notifying of the tornado in the area, it would be in the user's best interest to receive and view the message as soon as it is received. In other situations such as in a case of a missing person or kidnapping, it is desirable, or may be critical, to notify as soon as possible people in a relevant area such as a city where the missing or kidnapped person was last seen. Under emergency or time critical situations such as those described above, it is desirable to be able to receive an emergency message and to have the received emergency message communicated as soon as the emergency message is received.

DETAILED DESCRIPTION OF THE PREFERRED EMBODIMENTS

An emergency broadcast message receiver conveys information contained in a received emergency broadcast message to an external device, which communicates the information. The emergency broadcast message receiver monitors incoming broadcast messages for an emergency broadcast message, receives the emergency broadcast message, transmits an acknowledgment of the reception of the emergency broadcast message, and forwards the information contained in the emergency broadcast message to the external device, which communicates the information.

Figure 1:
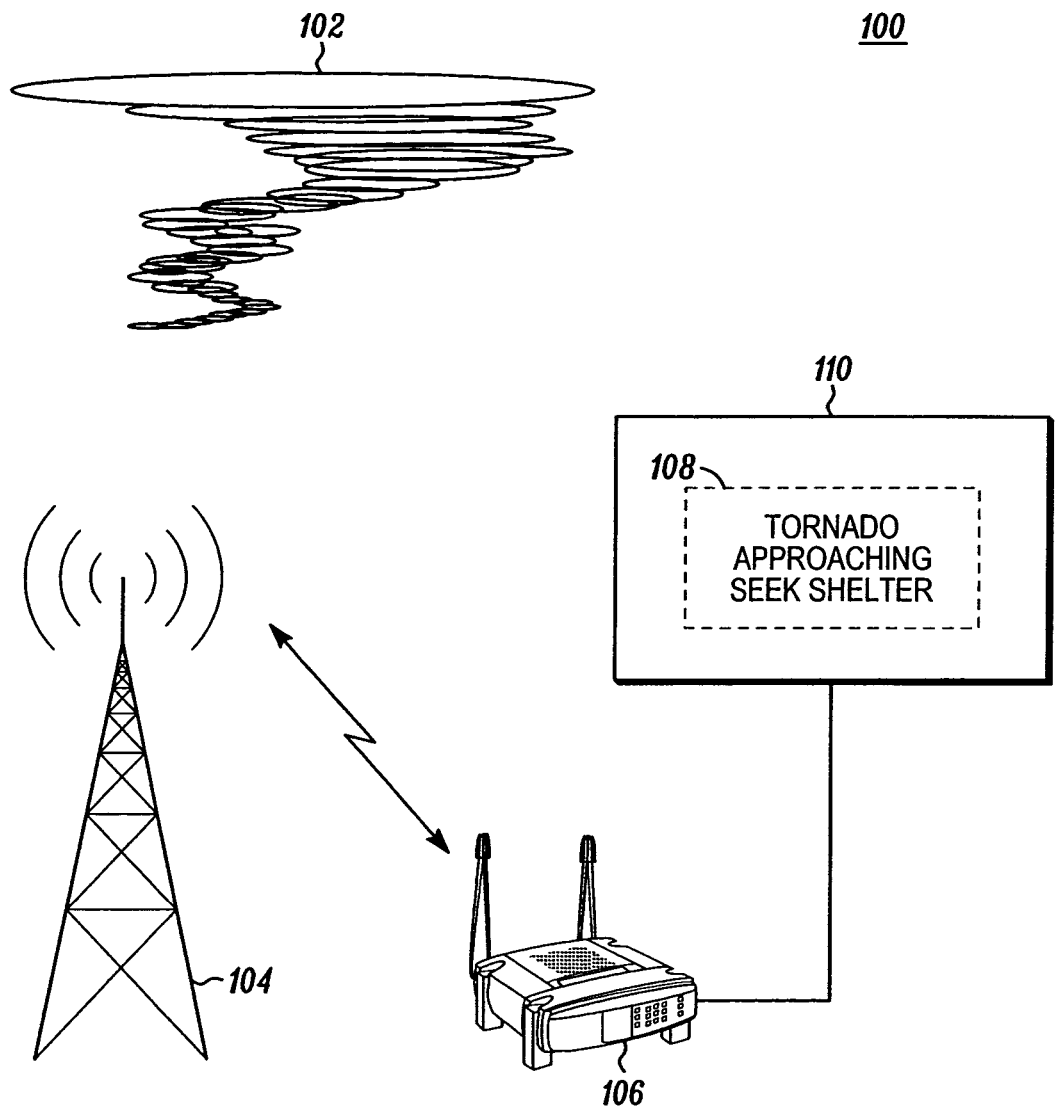
FIG. 1 is a block diagram of an environment where at least one of preferred embodiments may be practiced.

FIG. 1 is an exemplary environment 100, in which at least one of the preferred embodiments may be practiced. An emergency situation, shown as a tornado 102, is detected, and a base station 104, which has coverage over an area potentially affected by the tornado 102, broadcasts an emergency broadcast message. An emergency broadcast message receiver 106 receives the emergency broadcast message, and conveys information 108, which is shown as a text message indicative of the emergency situation "TORNADO APPROACHING. SEEK SHELTER," contained in the emergency broadcast message by utilizing an external device 110. The external device 110 may take various forms such as, but not limited to: an electronic billboard, which is capable of displaying various pictures and texts based upon an input signal; a large TV-like display commonly found in a sport stadium and in a convention center; a display unit made of an array of light emitting diodes ("LEDs") or light bulbs capable of displaying alphanumeric messages commonly found on highways displaying traffic information; a small display unit made of an array of LEDs commonly found on a vending machine; and a display unit or a communication console in an automobile. The information 108 may also take various forms based upon the nature of the emergency and the capability of the external device 110. For example, if the emergency broadcast message was an Amber alert, regarding a kidnapped child, then the information 108 may include a picture of the kidnapped child and a picture of a car similar to that of the kidnapper's as well as a text describing the kidnapped child and other relevant information. In some situations, it may be desirable to deliver the information 108 in a streaming video format. Because the information 108 may take various formats and the external device 110 connected to the emergency broadcast message receiver 106 may have various display and communication capabilities, the emergency broadcast message receiver 106 may first evaluate the capability of the external device 110, and then reformat the information 108 to a format compatible with the external device 110. For example, the picture of the kidnapped child would not be useful for an external device capable of displaying texts only, or for an external device only capable of audible communication.

Figure 2:
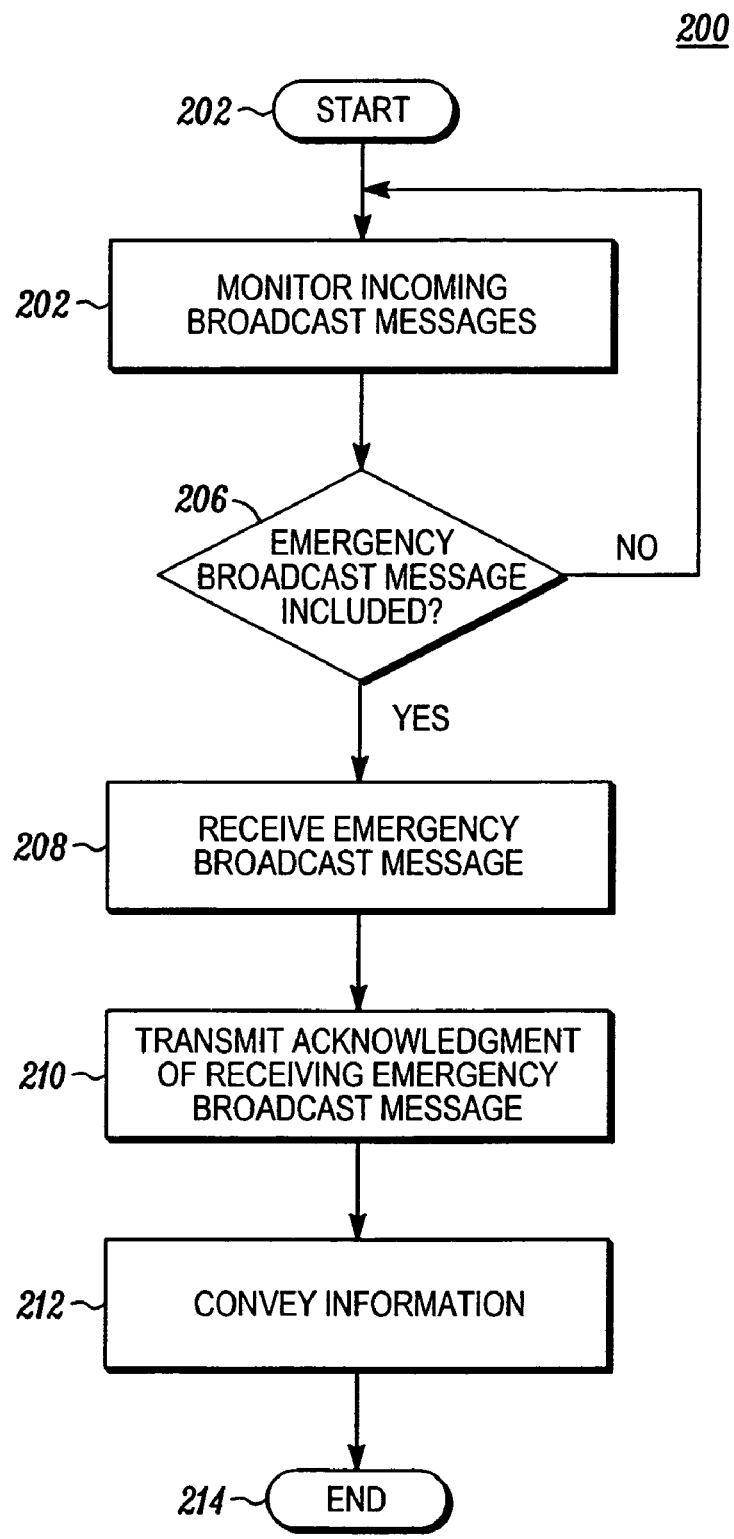
FIG. 2 is an exemplary flowchart for conveying information contained in an emergency broadcast message in accordance with at least one of the preferred embodiments.

FIG. 2 is an exemplary flowchart 200 for conveying information contained in an emergency broadcast message in accordance with at least one of the preferred embodiments. The process begins in block 202, and the emergency broadcast message receiver 106 monitors incoming broadcast messages in block 204. In block 206, the emergency broadcast message receiver 106 determines whether the incoming broadcast messages include an emergency broadcast message. The emergency broadcast message may be found by evaluating an emergency status indicator of each of the incoming broadcast messages. If no emergency broadcast message is found in block 206, then the process returns to block 204 and the emergency broadcast message receiver 106 continues to monitor the incoming broadcast messages. If an emergency broadcast message is found in block 206, then the emergency broadcast message receiver 106 receives the emergency broadcast message in block 208. The emergency broadcast message receiver 106 may receive the emergency broadcast message in various modes including, but not limited to, a broadcast mode and a multicast mode of a Multimedia Broadcast and Multimedia Service. In block 210, the emergency broadcast message receiver 106 transmits an acknowledgment of receiving the emergency broadcast message, and conveys information contained in the emergency broadcast message to the external device 110 in block 212. The emergency broadcast message receiver 106 may autonomously convey the information contained in the emergency broadcast message, or may wait for an input signal such as a user input. The process then terminates in block 214.

Figure 3:
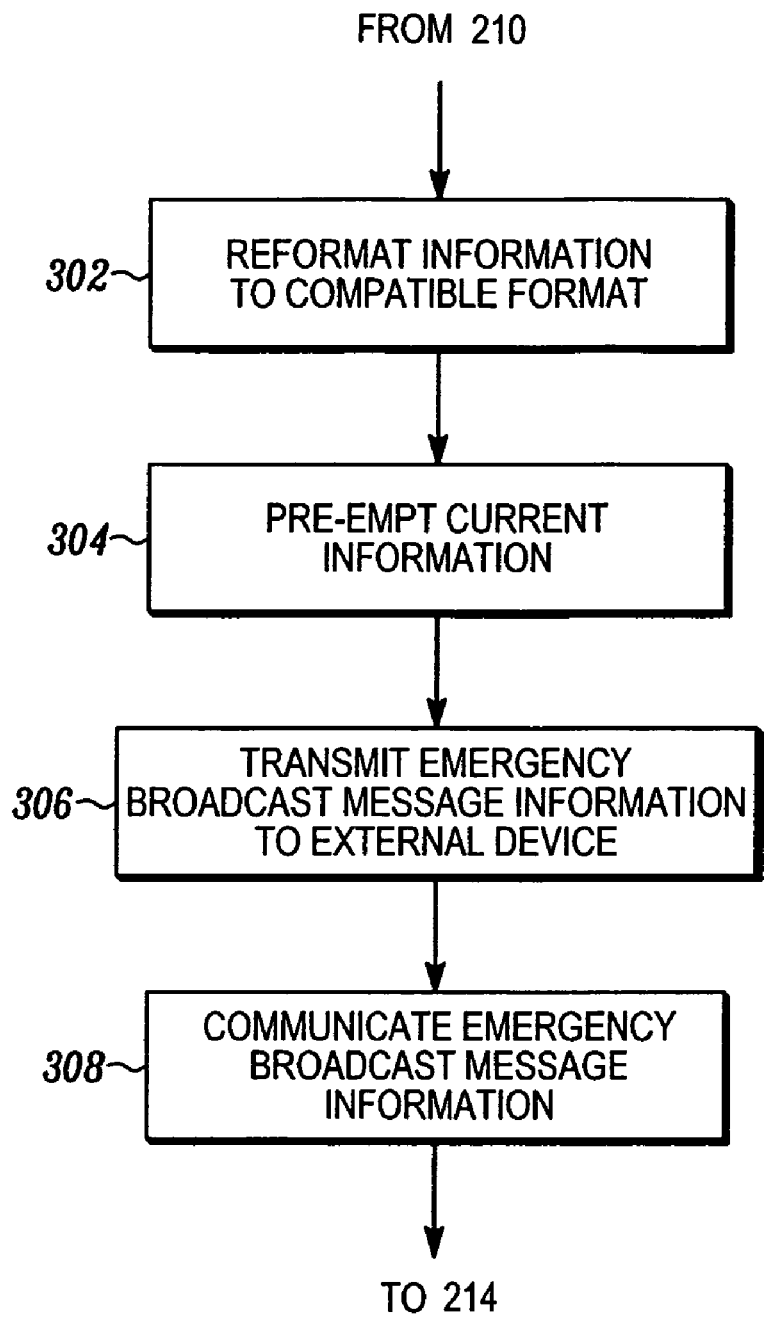
FIG. 3 is an exemplary flowchart further describing one of blocks in FIG. 2 for conveying information contained in an emergency broadcast message in accordance with at least one of the preferred embodiments.

FIG. 3 is an exemplary flowchart 300 further describing block 212 for the process of conveying information contained in an emergency broadcast message in accordance with at least one of the preferred embodiments. In block 302, the emergency message receiver 106 reformats the information contained in the emergency broadcast message to a format compatible with the external device 110 before transmitting the information to the external device 110. A user of the emergency message receiver 106 may program the emergency message receiver 106 such the information contained in the emergency broadcast message is reformatted to a format compatible with the external device 110. Alternatively, the emergency message receiver 106 may evaluate a capability of the external device 110 for the compatible format, and then reformat the information accordingly, or parse or strip out the components of the information, which are compatible with the external device 110. If the external device 110 is currently used and is communicating some information, then the emergency message receiver 106 preempts the current information being communicated by the external device 110 in block 304, and then transmits the information contained in the emergency broadcast message to the external device 110 in block 306. The emergency broadcast message receiver 106 may preempt the current information by providing a status flag, transmitting a wake-up message, interrupting the current information, or any other protocol indication to communicate the information contained in the emergency broadcast message over the current information being communicated. The emergency broadcast message receiver 106 may alternatively entrain the information contained in the emergency broadcast message, for example, displaying the information contained in the emergency broadcast message in a banner or in a picture-in-picture window along with the current information. If the emergency message receiver 106 were connected to several external devices through a network, then the emergency message receiver 106 may transmit the information contained in the emergency broadcast message to the network. Alternatively, the emergency message receiver 106 may make the information contained in the emergency broadcast message available to the external device 110 or to the network. In block 308, the emergency message receiver 106 communicates the information contained in the emergency broadcast message by utilizing the capability of the external device 110.

Figure 4:
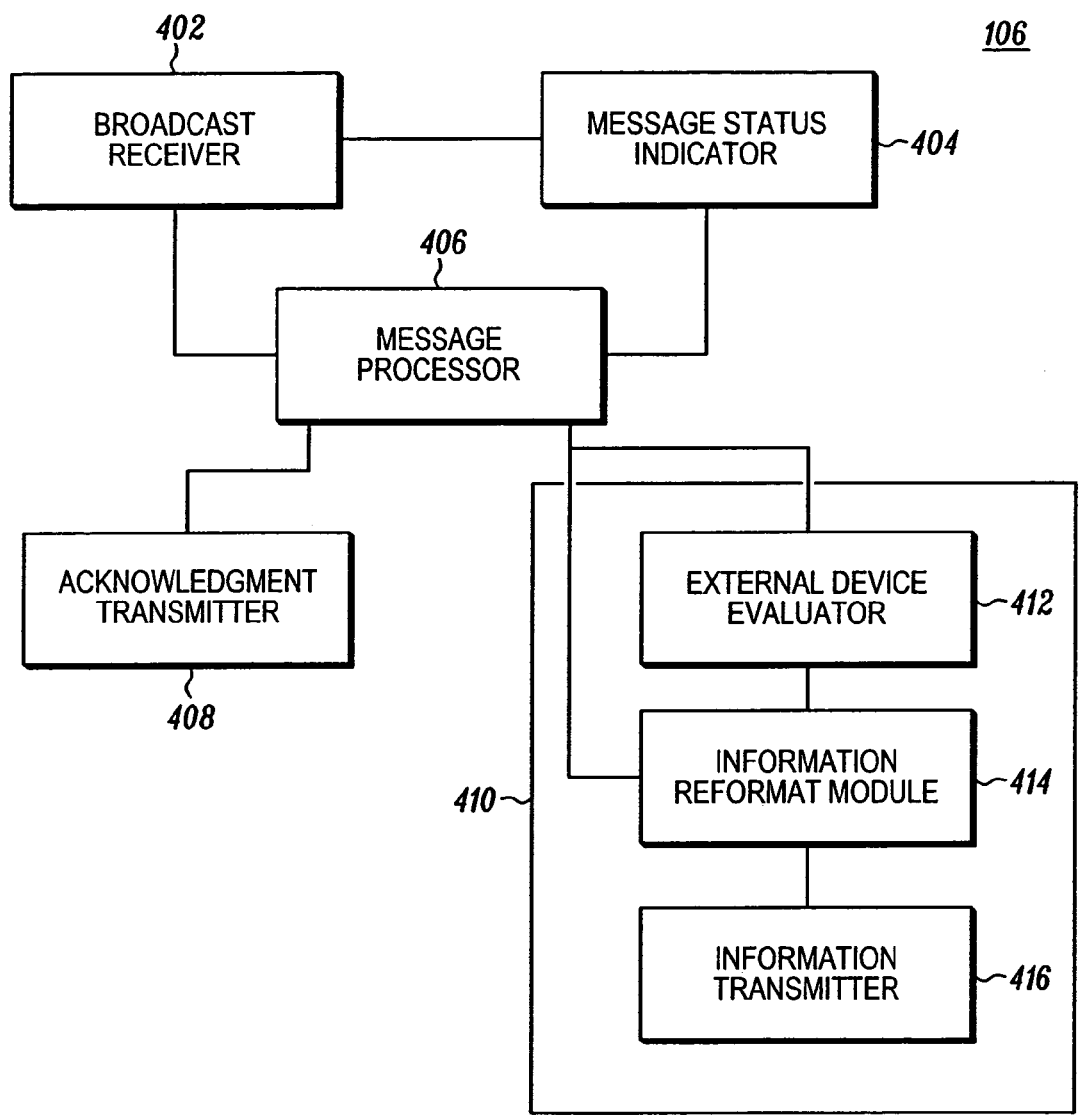
FIG. 4 is an exemplary block diagram of the emergency broadcast message receiver in accordance with at least one of the preferred embodiments.

FIG. 4 is an exemplary block diagram of the emergency broadcast message receiver 106 in accordance with at least one of the preferred embodiments. The emergency broadcast message receiver 106 has a broadcast receiver 402, which is configured to monitor incoming broadcast messages including the incoming broadcast messages in a broadcast mode and in a multicast mode of a Multimedia Broadcast and Multimedia Service. A message status indicator 404, which is coupled to the broadcast receiver 402, is configured to determine whether the incoming broadcast messages include an emergency broadcast message. A message processor 406 is coupled to the broadcast receiver 402 and to the message status indicator 404, and is configured to process the emergency broadcast message if the message status indicator 404 detects the emergency broadcast message. An acknowledgment transmitter 408, which is coupled to the message processor 406, is configured to transmit an acknowledgment of receiving the emergency broadcast message. An information communicator 410, which is coupled to the message processor 406, is configured to convey the information contained in the emergency broadcast message. The information communicator 410 has an external device evaluator 412, which is coupled to the message processor 406. The external device evaluator 412 is configured to evaluate a communication capability of the external device 110. An information reformat module 414 is coupled to the message processor 406 and to the external device evaluator 412, and is configured to reformat the information contained in the emergency broadcast message to a format compatible with the external device 110. The information reformat module 414 may parse or strip out the components of the information, which are compatible with the external device 110. An information transmitter 416, which is coupled to the information reformat module 414, is configured to transmit the reformatted information to the external device 110. The information transmitter 416 may be further configured to preempt current information being used by the external device 110 before transmitting the reformatted information. Alternatively, the information communicator 410 may be configured to make the information contained in the emergency broadcast message available to the external device 110.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a portable communication device for conveying an emergency broadcast message, the method comprising:
   receiving the emergency broadcast message, wherein receiving the emergency broadcast message includes at least one of:
      receiving the emergency broadcast message in a broadcast mode of a Multimedia Broadcast and Multimedia Service; or
      receiving the emergency broadcast message in a multicast mode of a Multimedia Broadcast and Multimedia Service;
   transmitting an acknowledgment of receiving the emergency broadcast message; and
   autonomously conveying information contained in the emergency broadcast message, which includes transmitting the information contained in the emergency broadcast message to an external device to preempt current information being communicated by the external device.

2. The method of claim 1, wherein receiving the emergency broadcast message includes:
   monitoring incoming broadcast messages; and
   determining whether the incoming broadcast messages include the emergency broadcast message.

3. The method of claim 2, wherein the emergency broadcast message includes an emergency status indicator.

4. The method of claim 1, further comprising:
providing the information contained in the emergency broadcast message at the external device.

5. The method of claim 1, further comprising:
reformatting the information contained in the emergency broadcast message to a format compatible with the external device before transmitting the information to the external device.

6. The method of claim 5, wherein reformatting the information contained in the emergency broadcast message to a format compatible with the external device includes:
evaluating a capability of the external device for the compatible format.

7. The method of claim 1, wherein conveying information contained in the emergency broadcast message includes:
making the information contained in the emergency broadcast message available to an external device capable of communicating the information contained in the emergency broadcast message.

8. The method of claim 1, wherein conveying information contained in the emergency broadcast message includes:
transmitting the information contained in the emergency broadcast message to a network of a plurality of external devices, each of the plurality of external device capable of communicating the information contained in the emergency broadcast message.

9. The method of claim 1, wherein conveying information contained in the emergency broadcast message includes:
making the information contained in the emergency broadcast message available to a network of a plurality of external devices, each of the plurality of external device capable of communicating the information contained in the emergency broadcast message.

10. A method in a portable wireless communication device for conveying information contained in an emergency broadcast message to an external device, the method comprising:
monitoring incoming broadcast messages in at least one of a broadcast mode and a multicast mode of a Multimedia Broadcast and Multimedia Service;
determining whether the incoming broadcast messages include the emergency broadcast message;
receiving the emergency broadcast message;
transmitting an acknowledgment of receiving the emergency broadcast message; and
autonomously transmitting the information contained in the emergency broadcast message to the external device to preempt current information being communicated by the external device.

11. The method of claim 10, wherein the emergency broadcast message includes an emergency status indicator.

12. The method of claim 10, wherein autonomously transmitting the information contained in the emergency broadcast message to the external device includes:
preempting current information being communicated by the external device before transmitting the information contained in the emergency broadcast message.

13. The method of claim 10, further comprising:
evaluating a capability of the external device;
reformatting the information contained in the emergency broadcast message to a format compatible with the capability of external device before transmitting the information to the external device; and
communicating the reformatted information by utilizing the external device.

14. An portable emergency broadcast message receiver comprising:
a broadcast receiver configured to monitor incoming broadcast messages;
a message status indicator coupled to the broadcast receiver, the message status indicator configured to determine whether the incoming broadcast messages include an emergency broadcast message;
a message processor coupled to the broadcast receiver and to the message status indicator, the message processor configured to process the emergency broadcast message;
an acknowledgment transmitter coupled to the message processor, the acknowledgment transmitter configured to transmit an acknowledgment of receiving the emergency broadcast message; and
an information communicator coupled to the message processor, the information communicator configured to convey information contained in the emergency broadcast message to an external device to preempt current information being used by the external device.

15. The emergency broadcast message receiver of claim 14, wherein the broadcast receiver is further configured to monitor the incoming broadcast messages in a broadcast mode and in a multicast mode of a Multimedia Broadcast and Multimedia Service.

16. The emergency broadcast message receiver of claim 14, wherein the information communicator comprises:
an information reformat module coupled to the message processor and to the external device evaluator, the information reformat module configured to reformat the information contained in the emergency broadcast message to a format compatible with the external device; and
an information transmitter coupled to the information reformat module, the information transmitter configured to transmit the reformatted information to the external device.

17. The emergency broadcast message receiver of claim 16, wherein the information communicator further comprises:
an external device evaluator coupled to the message processor, the external device evaluator configured to evaluate a communication capability of an external device.

18. The emergency broadcast message receiver of claim 16, wherein the information transmitter is further configured to preempt current information being used by the external device before transmitting the reformatted information.

19. The emergency broadcast message receiver of claim 14, wherein the information communicator is further configured to make the information contained in the emergency broadcast message available to an external device capable of communicating the information contained in the emergency broadcast message.

* * * * *